US006428828B1

(12) United States Patent
Jackson et al.

(10) Patent No.: US 6,428,828 B1
(45) Date of Patent: Aug. 6, 2002

(54) ENZYMATIC PROCESS FOR NIXTAMALIZATION OF CEREAL GRAINS

(75) Inventors: David S. Jackson; Deepak Sahai, both of Lincoln, NE (US)

(73) Assignee: The Board of Regents of the University of Nebraska, Lincoln, NE (US)

( * ) Notice: Subject to any disclaimer, the term of this patent is extended or adjusted under 35 U.S.C. 154(b) by 39 days.

(21) Appl. No.: 09/643,433

(22) Filed: Aug. 22, 2000

(51) Int. Cl.[7] .................................................. A23B 9/26
(52) U.S. Cl. ............................................ 426/18; 426/52
(58) Field of Search ............................. 426/49, 52, 44, 426/46, 18, 28, 31, 15

(56) References Cited

U.S. PATENT DOCUMENTS

| 5,395,637 A | 3/1995 | Reec ........................... 426/549 |
| 5,401,522 A | 3/1995 | Reeg ........................... 426/549 |
| 5,532,013 A | 7/1996 | Martinez-Bustos et al. . 426/496 |
| 5,558,898 A | 9/1996 | Sunderland .................. 426/626 |
| 5,652,010 A | 7/1997 | Gimmler et al. ............. 426/549 |
| 5,662,901 A * | 9/1997 | Tobey, Jr. et al. .......... 424/94.2 |
| 6,056,990 A | 5/2000 | Delrue et al. ................ 426/622 |

FOREIGN PATENT DOCUMENTS

| JP | 41-1000115 A * | 1/1999 |
| JP | 41-1032693 A * | 2/1999 |
| WO | WO 00/45647 | 8/2000 |

OTHER PUBLICATIONS

Katz et al., "Traditional Maize Processing Techniques in the New World". Science, vol. 184, pp. 765–773, May 1974.

Khan et al., "Cor Tortillas: Evaluation of Corn Cooking Procedures". Cereal Chemistry, vol. 59, pp. 279–284, Aug. 1982.

Gomez et al. "Changes in Corn and Sorghum During Nixtamalization and Tortilla Baking". Journal of Food Science, vol. 54, pp. 330–336, Apr. 1989.

Steinkraus, *Handbook of Indigenous Fermented Foods,* 2nd Ed., Marcel Dekker Inc., pp. 349–356, Jan. 1996.*

* cited by examiner

*Primary Examiner*—Keith Hendricks
(74) *Attorney, Agent, or Firm*—Senniger, Powers, Leavitt & Roedel

(57) ABSTRACT

Disclosed are novel methods of producing food compositions by the use of an enzymatic digestion of the component parts of whole portions of cereal grains, and grain materials, to impart advantageous qualities to the resulting flour and dough related products produced therefrom. The present invention specifically relates to the fields of making flour and dough, used for tortillas, corn chips, tortilla chips, snacks, half-products and related products from the component parts and whole portions of cereal grains, and related materials.

33 Claims, No Drawings

ENZYMATIC PROCESS FOR NIXTAMALIZATION OF CEREAL GRAINS

Part of this invention was made with governmental support under BES-9817050 awarded by the National Science Foundation under the Environmental Protection Agency/National Science Foundation partnership for environmental research program. The government may have certain rights to this invention.

FIELD OF THE INVENTION

The present invention relates to the fields of making flour and dough, used for producing flat breads such as tortillas, roti; snacks such as corn chips, tortilla chips; fried puffed snacks, half-product and related products, from the component parts and whole portions of cereal grains, grain materials, and non-cereal materials such as dry edible beans, oilseeds, tubers, bananas, carrots, and related materials. More particularly, this invention relates to a method for the production of flour and dough through the use of an enzymatic digestion process whereby component parts and whole portions of cereal grains, grain materials, and non-cereal materials such as dry beans, tubers and other food materials can be used as the starting material. The method of this invention imparts advantageous qualities to the resulting flour and dough such that it can be conveniently processed and sheeted, cut or extruded using common food processing equipment to produce a variety of foods and related products produced therefrom.

BACKGROUND OF THE INVENTION

Corn tortillas, tortilla chips, corn chips, taco shells, and burrito wraps and other related products are prepared by sheeting, cutting and baking and/or frying of corn dough pieces. These products are prepared from corn masa flour, which is instant masa flour which has been produced from nixtamalized corn or corm meal and rehydrated with water to form a dough, or stone ground corn dough/masa, which is dough or flour prepared by stone grinding of nixtamalized corn.

Traditionally, the production of instant masa flour or fresh corn masa dough material involves the process of nixtamalization. Nixtamalization involves the following essential steps: whole kernel corn is cooked at a temperature below or at boiling for a period of time in a medium which usually contains an alkaline agent, such as water containing lime [$Ca(OH)_2$]. The time and temperature of the cook often depends upon the hardness of the grain. Harder grain requires longer cook time and/or higher temperatures. Thereafter the cooked corn is allowed to steep (soak) for a period of time in the liquid, for example for about three to about fourteen hours. After steeping, the cook/steep liquor, which is the liquid medium in which the corn was cooked and steeped and is also known as nejayote, is drained and the retained grain is washed to remove the alkaline agent and other solubilized/dispersed materials. The processed (cooked and steeped) grain is known as nixtamal. Nixtamal is stone ground in a traditional stone grinder to produce fresh corn dough also known as masa. To produce instant masa flour, nixtamal is coarsely ground, dehydrated and milled into flour often referred to as instant masa flour. Instant masa flour can be conveniently re-hydrated by the addition of water to make masa dough. Stone ground fresh masa or instant masa flour dough is sheeted, cut baked and/or fried in oil to produce tortillas, tortilla chips, corn chips, taco shells and related products.

The preferred grain for use to produce tortillas and related products is corn or corn meal. With corn the alkaline cooking and steeping loosens the pericarp or outside bran layer of the corn kernel from the endosperm so that water can reach the starch and the pericarp can be removed.

Conventional nixtamalization processes for producing fresh masa dough or instant masa flour have several disadvantages. For example, the time required for steeping places production limits on equipment and increases the space requirements for the manufacturing facility. Additionally, the process uses large amounts of water and generates large quantities of effluent waste water that must be treated prior to disposal. The waste water from the traditional nixtamalization is highly alkaline as large amounts of alkaline lime solution are used to cook, steep and hydrate whole kernels of corn. The highly alkaline waste streams (pH approximately 9–12) also have a high biological and chemical oxygen demand (BOD/COD) values and are a potential pollutant because of their composition and characteristics. Nejayote also contains large amounts of dissolved pericarp, soluble/dispersed starches and other corn material that cannot be ecologically discharged into water ways or municipal waste water systems. Nejayote has a chemical oxygen demand (COD) of approximately 2500 mg/liter, a biological oxygen demand (BOD) of approximately 8100 mg/liter and a suspended solids content of approximately 20,000 mg/liter. Nejayote also contains approximately 310 mg/liter of nitrogen and approximately 180 mg/liter of phosphorus.

Commercial alkaline corn facilities discharge alkaline wastewater in large sedimentation tanks or lagoons for disposal. The wastewater cleaning operation is accomplished by sedimentation and microbial degradation of corn solids. The wastewater, due to its alkalinity and solids content, cannot be directly discharged in the environmental water streams before proper neutralization and clean-up. Generally, the manufacturing facility must bear the cost of treating the waste water prior to discharge.

Alkaline waste and wastewater disposal is a major concern during commercial nixtamalization. Alkaline cooking, steeping and washing of the corn solids causes partitioning of corn solids between corn material and waste water. Loss of corn solids i.e. yield loss during nixtamalization and cost of effluent processing are considerable. In a commerical operation, corn solid loss has been estimated to vary between 5 to 14% depending on the type of corn. (Katz et al., (1974) *Science* 184:765; Khan et al., (1982) *Cereal Chem.* 59:279–284). The effluents generated during alkaline cooking of corn known as nejayote are potential pollutants because of their composition and characteristics.

In recent years a number of processes have been developed for improving the efficiency of nixtamal and masa flour production. Many of these processes attempt to shorten the cooking or steeping time or vary the concentration of additives to increase production rates. One example is disclosed in U.S. Pat. No. 5,558,898 to Sunderland. This patent discloses a process for producing masa flour where the whole grain is partially cooked in a hot alkaline solution to partially gelatinize the starch and loosen the bran. Thereafter, the grain is debranned, flash dried and milled.

Further developments in the production of masa and masa flour use ground corn or corn flour as the starting material instead of whole corn. These processes typically treat the ground corn with water at elevated temperatures to hydrate the corn in less time than with conventional steeping. An example of such a process is disclosed in U.S. Pat. No. 5,532,013 to Martinez-Bustos et al. In this process whole corn flour is mixed with lime and water and heated to 60 degrees to 95 degrees Celsius in a cooker-extruder to partially cook the mixture. The partially cooked mixture is then discharged through a die to a cooling chamber and thereafter extruded through a nozzle.

Other processes of producing masa from ground corn are disclosed in U.S. Pat. Nos. 5,395,637 and 5,401,522 to Reeg. The disclosed processes form a mixture of corn flour, water and lime and heat the mixture slightly above the gelatinization temperature and then cool below the gelatinization temperature to only partially gelatinize the starch. The process disclosed in U.S. Pat. No. 5,652,010 to Gimmler discloses a similar method where the mixture is hydrated below the gelatinization temperature of the corn starch with subsequent gelatinization at controlled temperatures to only partially gelatinize the hydrated corn particles. The upper limit of the heating temperature is selected to carefully control the gelatinization of the starch.

The above-noted processes for producing nixtamal and masa flour have not completely overcome the deficiencies of the traditional masa production process. There remain concerns about product quality and production rate. Accordingly, there is a continuing need in the industry for an improved process of producing nixtamal and masa flour, as well as for the production of dough and flour from corn and food products other than corn.

Earlier attempts of subjecting other cereal grains to traditional nixtamalization have had only limited success and no major commercial application. Attempts at nixtamalization of sorghum resulted in an unacceptable colored and taste due to the presence of phenolic compounds in the grain. Sorghum dough also has poor machinability for producing table tortillas as compared to corn. Therefore, often blends of sorghum and corn are used to prepare tortillas.

There is a continuing need in the industry to develop alternatives to traditional nixtamalization that can also be applied to cereal grains other than corn and other food materials such as beans, lentils, tubers, potatoes etc.

SUMMARY OF THE INVENTION

The methods of this invention are useful as efficient and effective processes for producing flour and dough from grains such as corn, wheat, rice, etc., as well as food materials other than grains, such as dry beans, potatoes, bananas, carrots, and lentils etc. Among the several objects of this invention may be noted that using the process of the invention described herein not only permits production of a dough with advantageous function characteristics, such as good sheeting, cutting and machinability, but also enables customization of dough to a particular product. The methods of this invention also minimize or eliminate the amounts of waste water and solid waste created during the production of the flour and dough.

Briefly, therefore, the present invention is directed to a method of producing a food composition comprising: steeping in a solution of alkaline protease enzyme at least one of the food materials selected from the group consisting of grain, grain materials, and non-cereal materials; increasing the pH of the mixture above; steeping the mixture; removing the food materials from the mixture; grinding the food materials; and adding liquid to the ground product.

The present invention is further directed to a method of producing a food composition comprising: steeping in a solution of alkaline protease enzyme at least one of the food materials selected from the group consisting of grain, grain materials, and non-cereal materials; increasing the pH of the mixture above; removing the food materials from the mixture; dehydrating the food materials; and grinding the dehydrated product.

Abbreviations and Definitions

As used herein, the terms "masa" and "masa flour" shall mean flour produced from the nixtamalization of corn, corn meal, or a corn product.

As used herein, the term "nixtamal" shall mean the cooked and steeped grain that results from the process of nixtamalization.

As used herein, the term "nixtamalization" shall mean the process of cooking of a grain or grain material for a period of time, depending upon the hardness of the grain or grain material, in a medium which usually, although not always, contains an alkaline agent, such as water containing lime (Calcium hydroxide); thereafter, steeping of the grain or grain material for a period of time, subsequent draining of any remaining cooking liquor (steep liquor), washing of the grain or grain materials to remove any alkaline agent or other solubilized materials, and grinding of the grain or grain material, and drying of the resulting grain or grain material to make flour.

As used herein, the terms "cereal grain" or "grain" shall include wheat, rice, sorghum, millets, corn, and any seed or fruit of a cereal grass.

As used herein, the term "non-cereal material" shall mean any bean, including soybean, lentils, the seed of any of various erect or climbing leguminous plants, oilseeds, tubers, including potatoes, bananas, carrots, and other plant materials and their components.

As used herein, the term "grain material" shall include grain meal, ground cereal grain and ground non-cereal material.

As used herein, the term "meal" shall mean ground, with any sort of grinder, grain, grain material or non-cereal material.

As used herein, the term "half product" shall mean a stabilized, formed food material that can be further processed into the final food product, for example by frying, baking or puffing the half-product.

As used herein, the term "cooking" shall mean the process of subjecting a food material to heat.

As used herein, the term "hydrate" or "hydrated" refers to the process of combining the food materials of the invention with water or liquid. For example, if a food material is hydrated to about 25%, then the ratio of food material to liquid in the mixture would be 4:1.

As used herein, the term "dehydrate" or "dehydrated" refers to the process of removing liquid or water from the food materials of the invention.

As used herein, the term "dough" refers to a mixture of flour and other ingredients, including liquid or water, from which the food products of this invention are produced. Those food products include tortillas, corn chips, tortilla chips, potato chips, crispy snacks etc.

DETAILED DESCRIPTION OF THE INVENTION

The present invention is directed to an enzymatic process for producing flour and dough from cereal grains as well as from beans and other non-cereal materials. A variety of cereal grains such as wheat, rice, sorghum, millets, as well as grain materials such as corn meal, beans and other non-cereal materials such as oilseeds, tubers, bananas, carrots and related materials may be used as a starting product for this invention. The process of producing dough or flour by treating the cereal grain, grain material or non-cereal material with an enzyme agent that digests the grain, grain material, or non-cereal material creates a product with the requisite cohesiveness and stickiness necessary to form into a machinable dough with the proper sheeting characteristics for making tortillas, corn chips, tortilla chips, half-products, and related food products. Sufficient hydration and enzyme mobility is generally necessary for the enzyme action of this invention.

The method of this invention involves the use of an enzyme to accomplish nixtamalization of the cereal grain, grain material, or non-cereal material in order to produce dough and/or flour that exhibits texture, sheeting and machinability similar to that observed in good quality corn masa dough that has been produced by traditional nixtamalization.

The enzymes useful for this invention are from the family of protease enzymes. A protease enzyme is a proteolytic enzyme that degrades proteins to component amino acids. One unit activity of a protease enzyme is defined as the amount of enzyme that will hydrolize casein to produce color equivalent to 1.0 $\mu$mole (18 $\mu$g) of tyrosine per minute at a pH of 7.5 at 37° C. (color indicated by Folin Ciocalteu reagent). Common names of some protease enzymes include Bromelin, Chymopapain, chymotrypsin, clostripain, collagenase, ficin, papain, pepsin, proteinase A, proteinase K, and trypsin. The protease enzymes useful for this invention are alkaline protease enzymes. The preferred alkaline protease enzymes useful for this invention have alkaline protease activity found in the Enzyme Commission Number ranges of EC 3.4.24.- and EC 3.4.21.-. A more preferred alkaline protease useful for this invention is the alkaline protease enzyme designated EC 3.4.21.62. This particular alkaline protease is a bacterial protease produced by submerged culture of selected strains of *Bacillus licheniformis*. The major enzymatic activity of this enzyme is alkaline protease, although it also is a serine protease because it contains one serine amino acid in its catalytic site. This particular alkaline protease (EC 3.4.21.62) is stable in solution between pH of 5.0 and 10.0 . Optimum activity for the alkaline proteases of this invention is exhibited between the pH of 9.5 and 10.5 and at a temperature of approximately 60° C. At optimum conditions, the enzyme has a reaction time of approximately 30 minutes. Some of the alkaline protease enzymes useful for this invention can be completely inactivated by heating them at approximately 90° C. for approximately 15 minutes.

The minimum concentration of the enzyme that may be used for digestion will depend on enzyme activity and the extent of steep time. Lower concentrations of enzyme may be used with longer steeping. Enzyme mixtures of less purity may be used with longer steep time. The quantity of enzyme that may be added can be optimized for a food system depending on enzyme activity, steep time, enzyme mobility, extent of hydration and overall costs. Commercial food grade preparations of alkaline protease enzyme that may contain amylase enzyme activity are most preferred enzymes for use in this invention.

Alkaline proteases used in this invention exhibit optimum activity between the pH of 9 to 11, most preferably between 9.5 to 10.5. Any alkali known in the art may be used to adjust the pH of the food system. Lime (Calcium hydroxide) is a preferred alkali, however, other alkali such as sodium hydroxide or potassium hydroxide or a combination thereof may be used for pH adjustment.

Although the process of this invention may be used with any cereal grain, grain material, or non-cereal material, a preferred cereal grain for this invention is corn or a ground corn product such as corn meal. A corn kernel is known as a carypopsis, a dry, one-seeded, nutlike berry in which the fruit coat and seed are fused to form a single grain. Mature corn kernels are composed of four major parts: pericarp (hull or bran), germ (embryo), endosperm and tip cap. The pericarp (hull or bran) is the mature ovary wall that is beneath the cuticle, which is a water-impermeable cover for the corn kernel. The germ is characterized by its high fatty oil content and is rich in crude proteins, sugars and ash constituents. The endosperm contains the starch, and is lower in protein content than the germ and the bran. The tip cap is where the kernel is joined to the cob and is a continuation of the pericarp. When corn is cooked in lime (Calcium hydroxide) in the traditional nixtamalization process, the lime cooking results in weakening of the corn kernel cell walls facilitating pericarp removal, degradation or solubilization of the endosperm periphery, swelling of the starch granules and swelling of the proteins while maintaining granule integrity within the endosperm. It is believed that the resulting product is held together by a glue like mixture of dispersed material which consists of gelatinized starch, hydrated/hydrolyzed proteins, lipids and ions.

This invention provides an enzymatic nixtamalization method that creates a similar glue like material by the action of the enzyme, such as alkaline protease in the presence of alkaline conditions, preferably at a pH of 9–11. The glue like material provides the requisite cohesiveness and stickiness in the dough essential for obtaining optimal texture for the purposes of making tortillas and related products. The hull of corn contains on an average 6.2% protein. By degrading protein, the enzyme, such as alkaline protease, softens the pericarp facilitating its milling. Although not required or essential to the invention, the cellulosic material in the pericarp may be further digested and softened by using at least one of many cellulolytic enzymes activated under acidic conditions, preferably below a pH of 7.0. The cellulolytic enzymes useful for this invention are the enzymes or enzyme systems that hydrolyze the $\beta$-D-1,4-glucosidic bonds of cellulose, its oligomers and derivatives. The preferred cellulolytic enzymes useful for this invention have cellulolytic activity in the Enzyme Commission Number range of 3.2.1.-.

During production of the flour, the soft pericarp chunks are ground still finer producing flour that exhibits excellent continuous sheeting, cutting and machinability characteristics. The degradation of the protein by the enzyme of this invention alters the functionality of cereal grains, grain materials or non-cereal materials. Without being bound to any particular theory, applicants believe that the protein functionality and/or structure in all cereal grains, grain materials and non-cereal materials are altered by enzyme action in a manner similar to that achieved by alkaline cooking and steeping. Also, the drying of high moisture grain or other food materials at elevated temperatures results in some starch gelatinization essential for proper dough texture. However, over-steeping of corn in enzyme results in highly cohesive and sticky dough even when no thermal treatment is applied to gelatinize the starch. Therefore, the protein structure is believed to be sufficiently altered by the enzyme treatment alone without the need for thermal drying to create a glue-like consistency for making good machinable dough.

The enzyme action needed for the present invention requires sufficient hydration of the grain, grain material or non-cereal material, as well as sufficient enzyme mobility. Preferably, grain material, such as corn meal, is hydrated to approximately 50–100% before the enzyme treatment of this invention. Most preferably, grain material, such as corn meal, is hydrated to approximately 80–100% before the enzyme treatment of this invention. Also, preferably cereal grains used in this invention are hydrated to approximately 25–80% during enzyme treatment to facilitate enzyme mobility in the grain. Most preferably, cereal grains used in this invention are hydrated to approximately 25–50%. The moisture content can be determined using the AACC Offical Method for air-oven drying or any other known accurate moisture determination method.

During traditional nixtamalization of corn with lime, the water to corn ratio used industrially varies between 3:1 and 5:1. Excess water is required during traditional nixtamalization during cooking and steeping to compensate for evaporative water loss and water absorption by the corn kernels. It is generally believed that during traditional nixtamalization sufficient water must be present to cover the corn, lime (Calcium hydroxide) must be present, and large amounts of waste solids are always generated as a result of the process. In contrast, in enzymatic nixtamalization of the present invention, minimal or no cooking is required during the enzyme treatment. Also, in enzymatic nixtamalization of the present invention, the cooking and/or steeping process can take place without lime (Calcium hydroxide), and without the generation of large amounts of waste-solids. Thus, the water used during the enzymatic nixtamalization process of the present invention can be easily re-used or recycled without the need for extensive pre-treatment prior to re-use.

The enzymatic nixtamalization process of this invention can be used to produce flour or dough from cereal grains, grain materials or non-cereal materials using hard of soft grains, grain materials, or non-cereal materials. In traditional nixtamalization techniques, hard corn kernels are preferred due to reduced corn solid loss and superior flour functionality. In the enzymatic nixtamalization process of this invention, soft kernels can be used without adversely influencing corn solid loss and flour characteristics. When using soft grains, grain materials, or non-cereal materials the initial cooking step of this invention may be completely avoided and the soft grain, grain material, or bean may be directly steeped in the enzyme solution in a basic environment (a pH above 7.0), preferably at a temperature of approximately between 50 and 60° C. and a pH of approximately between 9 and 11. The resulting nixtamal is ground, dehydrated and milled into instant flour. The dehydration may be accomplished by drying the flour to a stable moisture content.

Typically, stable moisture content for most gain materials is less than 14% moisture. The drying may be accomplished by dehydrating the material in a forced air oven, air impingement oven or other dehydrating means. Moisture content may be determined using the AACC Offical Method for air-oven drying or by other known moisture determination upon the temperature used. The material could also be dried continuously and rapidly in an air impingement oven, or using other drying technologies. In a preferred embodiment, the gain and grain materials used in the present invention are hard and soft corn kernels using white as well as yellow dent corn types and corn meal from such corn kernels. The process of this invention may be used without adversely influencing corn solid loss and product characteristics. Also, an extra white masa flour can be produced using enzymatic nixtamalization of white corn hybrids followed by a washing step. The washing may be accomplished by using water or any other method known in the art.

The initial cooking treatment prior to the addition of enzyme described in this invention may also be adjusted according to the grain, grain material or non-cereal material used for production of the food product. For example, the dough functional characteristics such as stickiness are primarily influenced by the extent of starch gelatinization. The cook temperature and time may be optimized and adjusted depending on grain kernel hardness characteristics and the extent of stickiness required during sheeting/cutting operations. Harder corn is cooked for a longer time at higher temperatures, while softer corn is cooked for shorter times at lower temperatures. For hard grain kernels, usually a longer cook time is required to soften the hard kernels facilitating enzymatic digestion. For example, hard corn kernels may be cooked at 90° C. for ten to fifteen minutes to obtain the desired softness of the kernels prior to enzymatic digestion. As only partial starch gelatinization is required, extensive or excessive cooking results in excessive starch gelatinization and an over-sticky product exhibiting poor sheeting characteristics.

When using softer or medium hard grains, grain materials or non-cereal materials initial cooking can be completely avoided and the grain, grain materials or non-cereal materials can be directly steeped in the enzyme solution. Additional cooking is often required when making fresh dough, compared with that required for flour to achieve similar starch gelatinization levels. The steep time can be optimized by observing the hydration of the grain, grain material or non-cereal materials and the extent of enzyme action. For example, when corn kernel moisture content is observed to be in the range of 35–60%, then steeping of the corn kernels can be stopped when 0.1% enzyme is used at optimum conditions for enzyme activity. For the present invention, as with all known masa production techniques, it is essential to establish the intrinsic hardness character of the grain, grain material or non-cereal material used and optimize the enzymatic nixtamalization process.

Grinding methods known in the art may be used to grind the food materials that have been nixtamalized into either a dough or a flour, depending upon hydration of the food material. Grinding of wet grain or other material may be accomplished by using a masa stone grinder or other grinders known in the art. Additionally, water may be added during grinding of wet material prevent excessive starch gelatinization. Grinding of dehydrated material into flour may be accomplished by passing through a laboratory Buhler Burr mill and then through a hammer mill or by using a UD grinder or any other grinder known in the art. Flour with different particle sizes can be produced for specific food applications For example, a fine ground material can be produced for making corn tortillas while a courser ground material can be produced suitable for making a crispy chip product. Also, various portions of fine and course components can be mixed for specific applications. Grinding may also be accomplished by using commercial flour grinding equipment.

Additives such as flavoring compounds, colorants, spices and/or other food additives may be blended in the dough/flour to produce food products. Powdered lime can be blended in the flour at a rate of 0.04–0.5% to produce traditional alkaline flavored products. Blending 0–10% (flour weight basis) of Carboxy-Methyl-Cellulose (CMC) gum, as with all commercial dry flours, improves dough texture and sheeting characteristics. A preferred amount of CMC gum for blending into the flour would be approximately 0.5% (flour weight basis). Other gums and/or and starches may also be used as functional additives to improve or alter product characteristics.

When using the method of this invention to produce flour and dough from corn kernels or corn meal, the process offers several advantages over traditional nixtamalization. For example, the enzymatic nixtamalization eliminates the essential step of cooking whole kernel corn in a solution with an excess of lime (Calcium hydroxide). This eliminates the production of highly alkaline waste (with a pH of 9–12) streams called nejayote, which have high biological and chemical oxygen demand values (BOD/COD) and is considered a potential effluent. Also, the amount of corn solids lost during the enzymatic process is significantly lower as compared to the traditional nixtamalization process. An additional advantage of the enzymatic nixtamalization process is that it requires less energy to cook corn, as hot water after initial hydration of corn in the first step can be recycled and reused, thereby reducing overall energy and water requirements. This process also requires less water to steep the corn as the corn to water ratio used during the steeping was 1:1.5 resulting in less volume of steep liquor waste. The enzymatic nixtamalization process also requires less lime (calcium hydroxide) as compared to the traditional nixtamalization process. The steep liquor generated from enzymatic nixamalization is usually acidic to neutral as only little lime is used to adjust the pH. The enzymatic nixtamalization can be completed in less than four (4) hours when producing dough or flour resulting in time saving and afficient processing when compared to traditional nixtamalization.

The following examples describe and illustrate the concepts of the invention. The examples are intended to illustrate but not to limit the present invention. In light of the detailed description of the invention and the example presented below, it can be appreciated that the several aspects of the invention are achieved.

It is to be understood that the present invention has been described in detail by way of illustration and example in order to acquaint others skilled in the art with the invention, its principles, and its practical application. Particular formulations and processes of the present invention are not limited to the descriptions of the specific embodiments presented, but rather the descriptions and examples should be viewed in terms of the claims that follow and their equivalents. While some of the examples and descriptions below include some conclusions about the way the invention may function, the inventor does not intend to be bound by those conclusions and functions, but puts them forth only as possible explanations and uses.

It is to be further understood that the specific embodiments of the present invention as set forth are not intended as being exhaustive or limiting of the invention, and that many alternatives, modifications, and variations will be apparent to those of ordinary skill in the art in light of the foregoing examples and detailed description. Accordingly, this invention is intended to embrace all such alternatives, modifications, and variations that fall within the spirit and scope of the claims.

EXAMPLE 1
Enzymatic Process for Producing Instant Masa Flour

Whole kernel corn was cooked in water without lime in a nixtamalization tank. The cook temperature and time was adjusted for the corn hardness. The corn was steeped/digested in a 0.1% solution of alkaline protease enzyme between 50 and 60° C. The pH of the enzyme solution was increased to a pH of 10–11by adding small quantities of lime (calcium hydroxide). After steeping for about 4 hours, the corn was removed by draining the steep liquor. The corn was ground to coarse particles in a traditional stone grinder. No water was added during grinding, resulting in rapid heat generation during grinding due to shear and frictional energy. The ground corn was spread on trays and dehydrated in a forced air oven at temperatures between 80–150° C. to a moisture content of less that 110%. The moisture content was determined using the AACC Official Method for air-oven drying. The dehydrated material was ground into masa flour by first passing through a laboratory Buhler Burr mill and then through a hammer mill or a UD grinder. Dough was prepared by mixing about equal amounts of flour and water in a mixer, for example a Kitchenaid dough mixer or a Hobart mixer attached with a paddle. The dough was hand kneaded to form a pat. The resulting dough was used to prepare products such as tortillas, tortilla chips and taco shells.

Results

The dough prepared from this Example exhibited good cohesiveness and little stickiness, and had a smooth soft texture such that it has good sheeting characteristics. The food products prepared from the enzymatic nixtamalization masa flour have the appearance, flavor and texture similar to those prepared from commercially available traditionally nixtamalized corn (masa) flour. The enzymatic process resulted in higher product yields due to reduced corn solid loss in the waste streams. The corn solid loss was relatively low even when corn with high levels of stress-cracked or broken kernels is subjected to enzymatic nixtamalization. The above method may be used to produce a near neutral masa flour, similar to commercial neutral chip flour, as well as an alkaline masa flour.

EXAMPLE 2
Enzymatic Process for Fresh Masa Dough Production

Whole kernel corn was cooked in water without lime in a nixtamalization tank. The cook temperature and time may be adjusted depending upon corn hardness. The corn was steeped/digested in a (0.1% corn weight basis) solution of alkaline protease enzyme between 50–60° C. The pH of the enzyme solution was increased to pH 10–11 by adding small quantities of lime (calcium hydroxide). The pH was maintained between 10–11 for about 3 hours by slowly adding a dilute lime solution of 0.1% using a pH controller. After three hours the pH was allowed to become acidic by natural fermentation. A commercial food grade cellulolytic enzyme (0.1% initial corn weight basis) was added when the pH fell below 5.8. The steeping was continued for at least 3–4 hours to allow further corn digestion. After overnight steeping, the corn was removed by draining the steep liquor. The corn was ground in a stone masa grinder with water addition to produce fresh masa dough.

Results

The dough prepared from this example exhibited good cohesiveness and little stickiness, and had a smooth soft texture such that it has good sheeting characteristics.

EXAMPLE 3
Enzymatic Process for Converting Corn Meal to Instant Masa Flour

An aqueous solution of enzyme alkaline protease (0.1% corn weight basis) was prepared in quantities sufficient to achieve 80–100% hydration of corn meal. The pH of the solution was increased to about 11.0 by adding powdered lime (calcium hydroxide). While mixing the corn meal using a Hobart mixer fitted with a paddle, the enzyme-lime solution was gradually added. This resulted in hydration of the corn meal. The hydrated meal was incubated in an oven maintained at 55–60° C. for about 4–8 hours. After incubation, the meal was dehydrated at elevated temperature greater than 80° C. by spreading on trays in a forced air oven. (Note: other drying techniques may be employed).

The dried meal was milled into flour using a burr mill and a UD mill. Also, Carboxy-Methyl-Cellulose (CMC) (0.1–2.0% flour weight basis) gum was added to improve texture and sheeting characteristics of the dough.

Results

The dough prepared from the flour made from this example exhibited good cohesiveness and little stickiness, and had a smooth soft texture such that it has good sheeting characteristics. If desired, powdered lime can be blended with the flour to impart an alkaline flavor. The flour may also be made with different particle size specifications and blended to get a product suitable for specific food applications.

EXAMPLE 4
Enzyme Processed Rice for Making Fryable Snacks (Half-Products)

Rice was steeped in a solution of enzyme (alkaline protease) with sufficient lime to obtain a pH of approximately 10.5. The amount of enzyme added was 0.1% on a rice weight basis. The rice was steeped at a temperature of approximately between 50–60° C. for about 4–6 hours. This resulted in hydration of rice kernels. After steeping, the rice was removed from the enzyme solution and dehydrated at temperatures of approximately greater than 70° C. by spreading on trays in a forced air oven. (Note: may be dried by employing other drying technologies). The dried kernels of rice were milled into flour by using a burr mill and a UD mill. Also, 0.1–0.5% (flour weight basis) Carboxy-Methyl-Cellulose (CMC) gum was added to improve texture and sheeting characteristics. Other flavorings, colorings, salt or spices were blended in the rice flour. The flour was rehydrated with water in a mixer, a Hobart mixer, to form a dough. The dough was sheeted and cut in snacks that were dehydrated to form half products (dehydrating a half-product was done by passing through a baking oven, but may be done by drying in a forced air oven or in a continuous drying oven or using any other dehydration technology). The half product was fried in a hot oil to make crispy snacks.

Results

The above method resulted in crispy snacks exhibiting the same characteristics as other commercial snack products having good flavor, texture and taste.

EXAMPLE 5
Enzyme Processed Pinto Beams for Making Functional Bean Flour

Dry pinto beans were steeped in a solution of enzyme (alkaline protease) with sufficient lime to obtain a pH of approximately 10.5–11. The amount of enzyme added was 0.1% on a bean weight basis. The bean was steeped at a temperature between 50–60° C. for about 4–8 hours. This resulted in hydration of rice kernels. After steeping, the rice was removed from the enzyme solution and dehydrated at temperatures greater than 70° C., by spreading on trays in a forced air oven, but may also be done by employing other drying technologies. To accomplish rapid dehydration, beans may be coarsely ground in a grinder to reduce particle size and increase drying surface area. The dried beans or bean pieces were milled into flour by using a burr mill and a UD mill. Also, 0.1–0.5% (flour weight basis) Carboxy-Methyl-Cellulose (CMC) gum was added to improve texture and sheeting characteristics.

Results

The resulting flour exhibited the same qualities as other commercial flour products. Other flavorings, colorings, salt or spices may be blended in the bean flour prior to making the product. The bean flour can be incorporated in other food material to make products, such as instant masa flour to make tortilla chips with bean flavor.

EXAMPLE 6
Enzyme Processed Wheat Flour Suitable for Wheat Tortilla Production Using Sheeting and Cutting Equipment Wheat was steeped in a solution of enzyme (alkaline protease) with sufficient lime to obtain a pH of approximately 9–10.5. The amount of enzyme added was 0.1% on wheat grain weight basis. The wheat was steeped at a temperature between 50–60° C. for about 8 hours. This resulted in hydration of the wheat kernels. After steeping, the wheat was removed from the enzyme solution and dehydrated at temperatures greater than 70° C., by spreading on trays in a forced air oven, but may also be done by employing other drying technologies. The dried wheat was milled into flour by using a burr mill and a UD mill. Wheat flour from enzyme treated wheat kernels was used to make a dough by rehydrating with an equal amount of water. The dough was used to make wheat tortillas using traditional sheeting and cutting equipment used for making corn tortillas.

Results

The dough prepared from the wheat flour made from this example exhibited good sheeting and excellent machinability. The action of the enzyme altered the wheat gluten such that it lost most of its elasticity such that it could be used in a sheeting and cutting machine to prepare wheat tortillas.

EXAMPLE 7
Enzyme Processed Potato for Making Sheetable Potato Flour and Snacks Potatoes of a variety with reduced browning characteristics were procured and skinned, diced/cut. Alternatively, common potatoes could be procured, skinned and diced/cut and treated with citric acid or ascorbic acid or other additives/treatments to prevent browning, for example by soaking in a dilute solution of citric acid. The diced/cut skinned potatoes were steeped in a solution of enzyme (alkaline protease) with sufficient lime to obtain a pH of approximately 10.5–11. The amount of enzyme added was 0.1% on a potato weight basis. The potatoes were steeped at a temperature between 50–60° C. for about 4–12 hours. After steeping, the potatoes were removed from the enzyme solution and dehydrated at temperatures greater than 70° C., by spreading on trays in a forced air oven, although other drying technologies may be employed. To accomplish rapid dehydration, potatoes may be coarsely ground in a grinder to reduce particle size and increase drying surface area. The dried potato or potato pieces were milled into flour by using a burr mill and/or a UD mill. Carboxy-Methyl-Cellulose (CMC) gum was blended in the flour at a rate of 1% as a processing aid. The potato flour was re-hydrated to make sheetable dough suitable for making a wide variety of potato snacks, such as chips, half-products, etc.

Results

The dough prepared from the flour made from this example exhibited good cohesiveness and little stickiness, and had a smooth soft texture such that it has good sheeting characteristics.

What is claimed is:

1. A method of producing a food composition comprising:
   (a) steeping in a solution of alkaline protease enzyme under alkaline conditions at least one of the food materials selected from the group consisting of grain, and grain materials derived from grain;

(b) removing the food materials from the mixture of step (a);

(c) grinding the food materials from step (b);

(d) adding liquid to the ground product of step (c).

2. A method of claim 1 further comprising cooking said food materials in liquid without lime prior to the steeping of step (a).

3. A method of claim 1 further comprising the drying of the ground product of step (d).

4. A method of claim 1 wherein the grain is selected from the group consisting of corn, rice, wheat, sorghum, quinoa and proso millet.

5. A method of claim 1 wherein the grain material derived from grain is selected from the group consisting of corn meal, rice meal, wheat meal, sorghum meal, and quinoa meal.

6. A method of claim 2 wherein the food material is cooked at approximately 90° C. for a period of time up to about 30 minutes.

7. A method of claim 1 wherein the steeping of step (a) is in a 0.1% solution of alkaline protease enzyme.

8. A method of claim 1 wherein the steeping of step (a) is in a 0.02–0.05% solution of alkaline protease enzyme.

9. A method of claim 8 wherein the steeping step of (a) is done with the pH in the range of 9–11.

10. A method of claim 8 wherein the steeping step of (a) is done with the temperature at a range of about 50–60 degrees Celsius.

11. A method of claim 1 wherein the steeping of step (a) is done at a temperature at a range of about 50–60 degrees Celsius.

12. A method of claim 1 wherein the pH is maintained at an alkaline level in step (a) by the addition of a base independently selected from the group consisting of calcium hydroxide, sodium hydroxide, and potassium hydroxide.

13. A method of claim 1 wherein the pH is decreased below 7.0 after step (a) and before step (b), and a cellulolytic enzyme is subsequently added.

14. A method of claim 1 wherein the mixture of step (a) is allowed to steep for at least 3 hours.

15. A method of claim 1 wherein the liquid of step (d) is water.

16. A method of claim 1 wherein the liquid of step (d) is added in sufficient amount to form a dough.

17. A method of producing a food composition comprising:

(a) steeping in a solution of alkaline protease enzyme under alkaline conditions at least one of the food materials selected from the group consisting of grain, and grain materials derived from grain;

(b) removing the food materials from the mixture of step (a);

(c) dehydrating the food materials of step (b);

(d) grinding the dehydrated product of step (c).

18. A method of claim 17 further comprising the grinding of the food materials of step (b) prior to the dehydrating of the food materials of step (c).

19. A method of claim 17 further comprising cooking said food materials in water without lime prior to steeping said food materials in step (a).

20. A method of claim 17 wherein the grain is selected from the group consisting of corn, rice, wheat, sorghum, quinoa and proso millet.

21. A method of claim 17 wherein the grain material derived from grain is selected from the group consisting of corn meal, rice meal, wheat meal, sorghum meal, and quinoa meal.

22. A method of claim 19 wherein the food material is at a temperature above approximately 65° C. for a time up to about 30 minutes.

23. A method of claim 17 wherein the steeping of step (a) is in a 0.1% solution of alkaline protease enzyme.

24. A method of claim 17 wherein the steeping of step (a) is in a 0.02–0.05% solution of alkaline protease enzyme.

25. A method of claim 24 wherein the steeping step of (a) is done with the pH in the range of about 9–11.

26. A method of claim 24 wherein the steeping step of (a) is done with the temperature at a range of about 50–60 degrees Celsius.

27. A method of claim 17 wherein the steeping of step (a) is done at a temperature at a range of about 50–60 degrees Celsius.

28. A method of claim 17 wherein the pH is maintained at an alkaline level in step (a) by the addition of calcium hydroxide.

29. A method of claim 17 wherein the ground product of step (d) is dehydrated to a moisture content of less than 10%.

30. A method of claim 17 wherein the ground product of step (e) is dehydrated in a forced air oven at temperatures between 80–150 degrees Celsius.

31. A method of claim 17 wherein the food materials of step (b) are dehydrated in an apparatus independently selected from the group consisting of air impingement ovens, drum dryers, and continuous air ovens.

32. A method of claim 17 wherein the dehydrated material of step (d) is blended with powdered lime in an amount of about 0.04–0.05%.

33. A method of claim 17 wherein the dehydrated material of step (d) is blended with about 0–10% of Carboxy-Methyl-Cellulose gum.

* * * * *

UNITED STATES PATENT AND TRADEMARK OFFICE
CERTIFICATE OF CORRECTION

PATENT NO.       : 6,428,828 B1
APPLICATION NO.  : 09/643433
DATED            : August 6, 2002
INVENTOR(S)      : Jackson et al.

Page 1 of 1

It is certified that error appears in the above-identified patent and that said Letters Patent is hereby corrected as shown below:

Col. 1 lines 3-4 should read,
Rights in the United States Government

This invention was made with federal support under the following research grant: BES9817050 awarded by the NSF. The United States government has certain rights to this invention.

Signed and Sealed this

Twenty-fourth Day of February, 2009

JOHN DOLL
*Acting Director of the United States Patent and Trademark Office*